(12) United States Patent
Tapley et al.

(10) Patent No.: US 9,164,577 B2
(45) Date of Patent: Oct. 20, 2015

(54) AUGMENTED REALITY SYSTEM, METHOD, AND APPARATUS FOR DISPLAYING AN ITEM IMAGE IN A CONTEXTUAL ENVIRONMENT

(75) Inventors: John Tapley, Campbell, CA (US); Eric J. Farraro, San Jose, CA (US)

(73) Assignee: eBay Inc., San Jose, CA (US)

( * ) Notice: Subject to any disclaimer, the term of this patent is extended or adjusted under 35 U.S.C. 154(b) by 967 days.

(21) Appl. No.: 12/644,957

(22) Filed: Dec. 22, 2009

(65) Prior Publication Data

US 2011/0148924 A1    Jun. 23, 2011

(51) Int. Cl.
G06F 3/01    (2006.01)
G06F 3/03    (2006.01)
G06F 17/30    (2006.01)

(52) U.S. Cl.
CPC ............. *G06F 3/011* (2013.01); *G06F 3/0325* (2013.01); *G06F 17/30265* (2013.01)

(58) Field of Classification Search
CPC .................................................... G06T 19/006
See application file for complete search history.

(56) References Cited

U.S. PATENT DOCUMENTS

| | | | |
|---|---|---|---|
| 5,546,475 A | 8/1996 | Bolle et al. | |
| 5,579,471 A | 11/1996 | Barber et al. | |
| 5,781,899 A | 7/1998 | Hirata | |
| 5,870,149 A | 2/1999 | Comroe et al. | |
| 5,889,896 A | 3/1999 | Meshinsky et al. | |
| 6,151,587 A * | 11/2000 | Matthias | 705/14.1 |
| 6,157,435 A | 12/2000 | Slater et al. | |
| 6,216,227 B1 | 4/2001 | Goldstein et al. | |
| 6,278,446 B1 | 8/2001 | Liou et al. | |
| 6,477,269 B1 | 11/2002 | Brechner | |
| 6,483,570 B1 | 11/2002 | Slater et al. | |
| 6,484,130 B2 | 11/2002 | Dwyer et al. | |
| 6,512,919 B2 | 1/2003 | Ogasawara | |

(Continued)

FOREIGN PATENT DOCUMENTS

CN    102667913 A    9/2012
KR    20090056792 A    6/2009

(Continued)

OTHER PUBLICATIONS

Applying QR Code in Augmented Reality Applications, Kan et al., Dec. 14-15, 2009, pp. 1-6.*

(Continued)

*Primary Examiner* — Stephen R Koziol
*Assistant Examiner* — Phong Nguyen
(74) *Attorney, Agent, or Firm* — Schwegman Lundberg & Woessner, P.A.

(57) ABSTRACT

Method, apparatus, and system for providing an item image to a client for display in a contextual environment are described. In some embodiments, the user may select an item for display in the contextual environment, and the user may position a camera coupled to a processing system to capture the contextual environment. A marker may be generated and associated with an item selected by a user. In an embodiment, the generated marker may be placed in a location within the contextual environment, and the user's processing system may send a visual data stream of the camera-captured environment to a server. In an embodiment, the user's processing device may receive a modified data stream including an image of the item, and the user's processing device may display the item image in the same location as the marker.

20 Claims, 6 Drawing Sheets

(56) References Cited

U.S. PATENT DOCUMENTS

| | | | |
|---|---|---|---|
| 6,530,521 B1 | 3/2003 | Henry | |
| 6,549,913 B1 | 4/2003 | Murakawa | |
| 6,563,959 B1 | 5/2003 | Troyanker | |
| 6,724,930 B1* | 4/2004 | Kosaka et al. | 382/154 |
| 6,763,148 B1 | 7/2004 | Sternberg et al. | |
| 6,901,379 B1 | 5/2005 | Balter et al. | |
| 6,947,571 B1 | 9/2005 | Rhoads et al. | |
| 7,149,665 B2 | 12/2006 | Feld et al. | |
| 7,254,779 B1* | 8/2007 | Rezvani et al. | 715/745 |
| 7,460,735 B1 | 12/2008 | Rowley et al. | |
| 7,495,674 B2 | 2/2009 | Biagiotti et al. | |
| 7,702,185 B2 | 4/2010 | Keating et al. | |
| 7,801,893 B2 | 9/2010 | Gulli et al. | |
| 7,890,386 B1 | 2/2011 | Reber | |
| 7,921,040 B2 | 4/2011 | Reber | |
| 7,933,811 B2 | 4/2011 | Reber | |
| 8,078,498 B2 | 12/2011 | Edmark | |
| 8,130,242 B2 | 3/2012 | Cohen | |
| 8,230,016 B1 | 7/2012 | Pattan et al. | |
| 8,260,846 B2 | 9/2012 | Lahav | |
| 8,275,590 B2 | 9/2012 | Szymczyk et al. | |
| 2001/0034668 A1* | 10/2001 | Whitworth | 705/27 |
| 2002/0052709 A1* | 5/2002 | Akatsuka et al. | 702/153 |
| 2002/0072993 A1 | 6/2002 | Sandus et al. | |
| 2002/0107737 A1 | 8/2002 | Kaneko et al. | |
| 2003/0051255 A1 | 3/2003 | Bulman et al. | |
| 2003/0085894 A1* | 5/2003 | Tatsumi | 345/426 |
| 2003/0112260 A1 | 6/2003 | Gouzu | |
| 2003/0123026 A1* | 7/2003 | Abitbol et al. | 351/204 |
| 2003/0208409 A1 | 11/2003 | Mault | |
| 2004/0019643 A1 | 1/2004 | Zirnstein, Jr. | |
| 2004/0046779 A1* | 3/2004 | Asano et al. | 345/716 |
| 2004/0057627 A1 | 3/2004 | Abe et al. | |
| 2004/0205286 A1 | 10/2004 | Bryant et al. | |
| 2005/0081161 A1* | 4/2005 | MacInnes et al. | 715/765 |
| 2005/0151963 A1* | 7/2005 | Pulla et al. | 356/139.03 |
| 2005/0283379 A1 | 12/2005 | Reber | |
| 2006/0012677 A1* | 1/2006 | Neven et al. | 348/61 |
| 2006/0015492 A1 | 1/2006 | Keating et al. | |
| 2006/0032916 A1* | 2/2006 | Mueller et al. | 235/385 |
| 2006/0038833 A1* | 2/2006 | Mallinson et al. | 345/633 |
| 2006/0071945 A1 | 4/2006 | Anabuki | |
| 2006/0071946 A1 | 4/2006 | Anabuki et al. | |
| 2006/0120686 A1 | 6/2006 | Liebenow et al. | |
| 2006/0184013 A1* | 8/2006 | Emanuel et al. | 600/426 |
| 2007/0078846 A1 | 4/2007 | Gulli et al. | |
| 2007/0133947 A1 | 6/2007 | Armitage et al. | |
| 2007/0143082 A1* | 6/2007 | Degnan | 703/1 |
| 2008/0037877 A1 | 2/2008 | Jia et al. | |
| 2008/0046738 A1 | 2/2008 | Galloway et al. | |
| 2008/0071559 A1* | 3/2008 | Arrasvuori | 705/1 |
| 2008/0074424 A1* | 3/2008 | Carignano | 345/473 |
| 2008/0082426 A1 | 4/2008 | Gokturk et al. | |
| 2008/0142599 A1 | 6/2008 | Benillouche et al. | |
| 2008/0163379 A1* | 7/2008 | Robinson et al. | 726/27 |
| 2008/0170810 A1 | 7/2008 | Wu et al. | |
| 2008/0177640 A1 | 7/2008 | Gokturk et al. | |
| 2008/0205764 A1 | 8/2008 | Iwai et al. | |
| 2008/0240575 A1 | 10/2008 | Panda et al. | |
| 2009/0094260 A1 | 4/2009 | Cheng et al. | |
| 2009/0109240 A1* | 4/2009 | Englert et al. | 345/633 |
| 2009/0240735 A1 | 9/2009 | Grandhi et al. | |
| 2009/0287587 A1 | 11/2009 | Bloebaum et al. | |
| 2009/0304267 A1 | 12/2009 | Tapley et al. | |
| 2009/0319388 A1 | 12/2009 | Yuan et al. | |
| 2009/0319887 A1* | 12/2009 | Waltman et al. | 715/246 |
| 2009/0325554 A1 | 12/2009 | Reber | |
| 2010/0015960 A1 | 1/2010 | Reber | |
| 2010/0015961 A1 | 1/2010 | Reber | |
| 2010/0015962 A1 | 1/2010 | Reber | |
| 2010/0045701 A1* | 2/2010 | Scott et al. | 345/633 |
| 2010/0048290 A1* | 2/2010 | Baseley et al. | 463/25 |
| 2010/0082927 A1 | 4/2010 | Riou | |
| 2010/0198684 A1 | 8/2010 | Eraker et al. | |
| 2010/0214284 A1* | 8/2010 | Rieffel et al. | 345/419 |
| 2010/0241650 A1 | 9/2010 | Chittar | |
| 2010/0287511 A1* | 11/2010 | Meier et al. | 715/848 |
| 2011/0016487 A1* | 1/2011 | Chalozin et al. | 725/35 |
| 2011/0029334 A1 | 2/2011 | Reber | |
| 2011/0055054 A1* | 3/2011 | Glasson | 705/27.2 |
| 2011/0246064 A1 | 10/2011 | Nicholson | |
| 2012/0072233 A1 | 3/2012 | Hanlon et al. | |
| 2012/0192235 A1 | 7/2012 | Tapley et al. | |
| 2012/0195464 A1 | 8/2012 | Ahn | |
| 2012/0284105 A1 | 11/2012 | Li | |
| 2013/0019177 A1 | 1/2013 | Schlossberg et al. | |
| 2013/0050218 A1* | 2/2013 | Beaver et al. | 345/440 |
| 2014/0085333 A1 | 3/2014 | Pugazhendhi et al. | |

FOREIGN PATENT DOCUMENTS

| | | |
|---|---|---|
| WO | WO-9944153 A1 | 9/1999 |
| WO | WO-2011087797 A2 | 7/2011 |
| WO | WO-2011087797 A3 | 7/2011 |

OTHER PUBLICATIONS

"U.S. Appl. No. 12/371,882, Examiner Interview Summary mailed Feb. 27, 2012", 3 pgs.

"U.S. Appl. No. 12/371,882, Final Office Action mailed Mar. 13, 2013", 24 pgs.

"U.S. Appl. No. 12/371,882, Final Office Action mailed Nov. 14, 2011", 21 pgs.

"U.S. Appl. No. 12/371,882, Non Final Office Action mailed Jun. 8, 2011", 22 pgs.

"U.S. Appl. No. 12/371,882, Non Final Office Action mailed Oct. 23, 2012", 21 pgs.

"U.S. Appl. No. 12/371,882, Preliminary Amendment filed Feb. 16, 2009", 4 pgs.

"U.S. Appl. No. 12/371,882, Preliminary Amendment mailed Jun. 15, 2009", 3 pgs.

"U.S. Appl. No. 12/371,882, Response filed Jan. 22, 2013 to Non Final Office Action mailed Oct. 23, 2012", 12 pgs.

"U.S. Appl. No. 12/371,882, Response filed Mar. 14, 2012 to Final Office Action mailed Nov. 14, 2011", 10 pgs.

"U.S. Appl. No. 12/371,882, Response filed Jun. 13, 2013 to Final Office Action mailed Mar. 13, 2013", 14 pgs.

"U.S. Appl. No. 12/371,882, Response filed Sep. 8, 2011 to Non Final Office Action mailed Jun. 8, 2011", 13 pgs.

"U.S. Appl. No. 12/398,957 , Response filed Dec. 29, 2011 to Non Final Office Action mailed Jul. 29, 2011", 15 pgs.

"U.S. Appl. No. 12/398,957, Final Office Action mailed Nov. 7, 2012", 22 pgs.

"U.S. Appl. No. 12/398,957, Non Final Office Action mailed Mar. 29, 2012", 23 pgs.

"U.S. Appl. No. 12/398,957, Non Final Office Action mailed Jul. 29, 2011", 23 pgs.

"U.S. Appl. No. 12/398,957, Response filed Mar. 7, 2013 to Final Office Action mailed Nov. 7, 2012", 12 pgs.

"U.S. Appl. No. 12/398,957, Response filed Jul. 30, 2012 to Non Final Office Action mailed Mar. 29, 2012", 13 pgs.

"U.S. Appl. No. 12/406,016, Examiner Interview Summary mailed May 15, 2012", 3 pgs.

"U.S. Appl. No. 12/406,016, Final Office Action mailed Feb. 29, 2012", 25 pgs.

"U.S. Appl. No. 12/406,016, Non Final Office Action mailed Jun. 21, 2011", 21 pgs.

"U.S. Appl. No. 12/406,016, Response filed May 17, 2012 to Non Final Office Action mailed Feb. 29, 2012", 16 pgs.

"U.S. Appl. No. 12/406,016, Response filed Sep. 21, 2011 to Non Final Office Action mailed Jun. 21, 2011", 17 pgs.

"U.S. Appl. No. 61/033,940, Application filed Mar. 5, 2008", 56 pgs.

"European Application Serial No. 10803429.9, Office Action mailed Aug. 22, 2012", 2 pgs.

"European Application Serial No. 10803429.9, Response filed Jan. 21, 2013 to Office Action mailed Aug. 22, 2012", 10 pgs.

"International Application Serial No. PCT/US2010/061628, International Preliminary Report on Patentability mailed Jul. 5, 2012", 6 pgs.

(56) References Cited

OTHER PUBLICATIONS

"International Application Serial No. PCT/US2010/061628, International Search Report mailed Aug. 12, 2011", 4 pgs.
"International Application Serial No. PCT/US2010/061628, Written Opinion mailed Aug. 12, 2011", 4 pgs.
"RedLaser—Impossibly Accurate Barcode Scanning", [Online] Retrieved from the Internet: http://redlaser.com/index.php, (Accessed Jul. 8, 2011), 2 pgs.
"S60 Camera Phones Get Image Recognition Technology", [Online]. Retrieved from the Internet: <URL: http://news.softpedia.com/news/S60-Camera-Phones-Get-Image-Recognition-Technology-79666.shtml>, (Feb. 27, 2008), 2 pgs.
"SnapTell: Technology", [Online]. Retrieved from the Internet: <URL: http://web.archive.org/web/20071117023817/http://www.snaptell.com/technology/index.htm>, (Nov. 17, 2007), 1 pg.
"The ESP Game", [Online]. Retrieved from the Internet: <URL: http://www.espgame.org/instructions.html>, (Accessed Nov. 13, 2007), 2 pgs.
"YouTube Occipitaihq, RedLaser 2.0: Realtime iPhone UPC barcode scanning", [Online] Retrieved from the Internet: http://www.youtube.com/watch?v=9_6k visited Jul. 8, 2011, (Jun. 16, 2009), 1 pg.
Gonsalves, Antone, "Amazon Launches Experimental Mobile Shopping Feature", [Online]. Retrieved from the Internet: <URL: http://www.informationweek.com/news/internet/retail/showArticle.jhtml?articleID=212201750&subSection=News>, (Dec. 3, 2008), 1 pg.
Parker, J.R., et al., "Algorithms for Image Processing and Computer Vision", Wiley Computer Publishing, (1997), 23-29.
Patterson, Ben, "Amazon iPhone app takes snapshots, looks for a match", [Online]. Retrieved from the Internet: <URL: http://tech.yahoo.com/blogs/patterson/30983>, (Dec. 3, 2008), 3 pgs.
Terada, S., "New cell phone services tap image-recognition technologies", [Online]. Retrieved from the Internet: <URL: http://search.japantimes.co.jp/cgi-bin/nb20070626a1.html>, (Jun. 26, 2007), 3 pgs.
Von Ahn, Luis, et al., "Labeling images with a computer game", Proceedings of the SIGCHI Conference on Human Factors in Computing Systems, (2004), 319-326.

"U.S. Appl. No. 12/371,882, Final Office Action mailed Dec. 18, 2013", 26 pgs.
"U.S. Appl. No. 12/371,882, Response filed Dec. 2, 2013 to Non Final Office Action mailed Aug. 30, 2013", 13 pgs.
"U.S. Appl. No. 13/194,584, Response filed Dec. 19, 2013 to Non Final Office Action mailed Sep. 19, 2013", 13 pgs.
"Korean Application Serial No. 2012-7019181, Notice of Preliminary Rejection mailed Nov. 18, 2013", with English translation of claims, 11 pgs.
"U.S. Appl. No. 12/371,882, Examiner Interview Summary mailed Nov. 20, 2013", 3 pgs.
"U.S. Appl. No. 12/371,882, Non Final Office Action mailed Aug. 30, 2013", 20 pgs.
"U.S. Appl. No. 13/194,584, Non Final Office Action mailed Sep. 19, 2013", 25 pgs.
"U.S. Appl. No. 12/371,882, Response filed May 8, 2014 to Final Office Action maied Dec. 18, 2013", 12 pgs.
"U.S. Appl. No. 12/371,882, Response filed May 8, 2014 to Final Office Action mailed Dec. 18, 2013", 12 pgs.
"U.S. Appl. No. 13/194,584, Final Office Action mailed Mar. 27, 2014", 22 pgs.
"U.S. Appl. No. 13/194,584, Examiner Interview Summary mailed May 19, 2014", 3 pgs.
"U.S. Appl. No. 13/194,584, Response filed Jun. 26, 2014 to Final Office Action mailed Mar. 27, 2014", 14 pgs.
"Chinese Application Serial No. 201080059424.5, Response filed Sep. 4, 2014 to Office Action mailed Apr. 21, 2014", with English translation of claims, 10 pgs.
"Korean Application Serial No. 2012-7019181, Notice of Final Rejection mailed Nov. 3, 2014", with English translation of claims, 7 pgs.
"Korean Application Serial No. 2012-7019181, Office Action mailed Jun. 26, 2014", with English translation of claims, 5 pgs.
"U.S. Appl. No. 12/371,882, Non Final Office Action mailed Mar. 12, 2015", 29 pgs.
"U.S. Appl. No. 13/624,682, Non Final Office Action mailed Jan. 22, 2015", 9 pgs.
"Korean Application Serial No. 2012-7019181, Notice of Appeal filed Feb. 4, 2015", with English translation of claims, 24 pgs.

* cited by examiner ered in enough detail to enable those skilled in the art to practice the present subject matter. The embodiments may be combined, other embodiments may be utilized, or structural, logical and electrical changes may be made without departing from the scope of what is claimed. The following detailed description is, therefore, not to be taken in a limiting sense, and the scope is defined by the appending claims and their equivalents.

AUGMENTED REALITY SYSTEM, METHOD, AND APPARATUS FOR DISPLAYING AN ITEM IMAGE IN A CONTEXTUAL ENVIRONMENT

TECHNICAL FIELD

This application generally relates to electronic commerce (e-commerce) and specifically to a computer-implemented augmented reality item image overlay method and system.

BACKGROUND

Item listings on online shopping and auction websites (e.g., e-commerce companies) may often provide images related to the item for sale to supplement a text description of the item. The images may be in the form of a digital photograph, a drawing, or in some cases, a video clip or any combination of these. For some items, there may be multiple images (e.g., digital photos) providing different angles and views of the item. In some examples, the images may be in a contextual environment, such as a sofa in a living room. In other examples, the item image may merely depict the item without a contextual environment.

BRIEF DESCRIPTION OF DRAWINGS

Embodiments of the present invention are illustrated by way of example and not limitation in the Figures of the accompanying drawings, in which like reference numbers indicate similar elements and in which.

DETAILED DESCRIPTION

Figure 1:
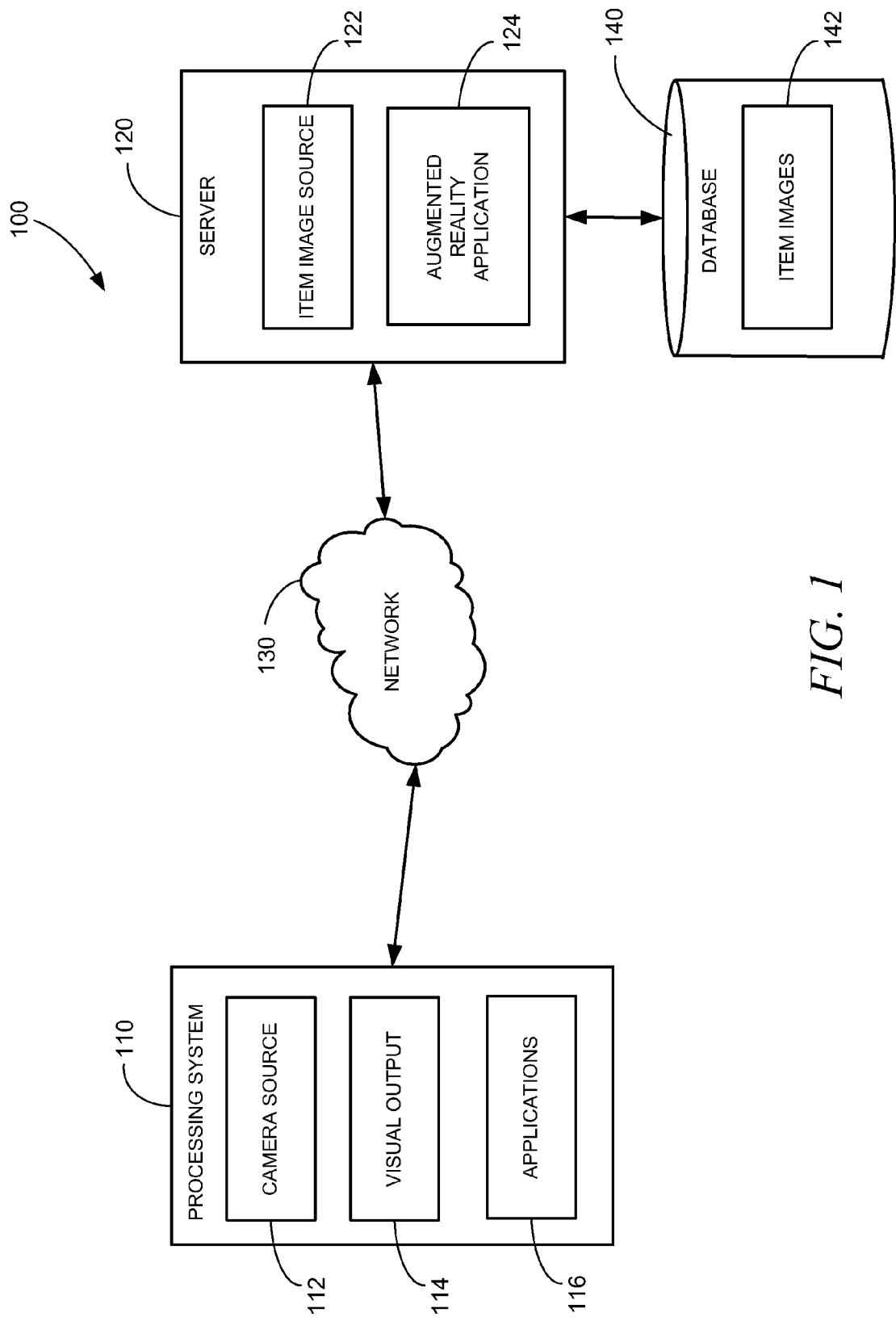
FIG. 1 is a diagrammatic representation of a network within which an example augmented reality system for providing modified visual data to a processing system may be implemented.

Systems and methods for displaying an item image on a screen as the item would appear positioned at a location in a camera-captured environment are discussed. In the following description, for purposes of explanation, numerous specific details are set forth in order to provide a thorough understanding of an embodiment of the present invention. It will be evident, however, to one skilled in the art that the present invention may be practiced without these specific details. The following detailed description includes reference to the accompanying drawings, which form a part of the detailed description. The drawings show illustrations in accordance with example embodiments. These example embodiments, which are also referred to herein as "examples," are described Augmented reality generally refers to creating a mixed virtual and real world environment though computer-generated imagery. Elements of the real world are mixed with virtual images in a real-time environment to provide a user with information and a visual effect that may not be entirely available otherwise.

In an online publication system such as an online trading platform, where a seller may post items for sale, it may be desirable to view how a particular item would appear in a location specified by a user to aid the user's purchase decision. For example, a user considering purchasing a sofa for a living room may need to determine where to position the sofa, and generally, how the sofa would appear in the living room. The user may wish to view the sofa as it would appear in the living room without actually possessing the sofa. Furthermore, the user may prefer to compare various sofas, view how the sofa would look from different angles in the room, or even surround the sofa with other items to create a furniture ensemble without physically moving the actual furniture. In an example embodiment, an augmented reality system may provide a user with the ability to arrange and rearrange a virtual sofa (and additional items, if desired) in an environment (e.g., a living room) captured by a camera instead of requiring physical movement of an actual sofa.

In an example embodiment, the method allows a user to place a marker (e.g., a placeholder such as a piece of paper with contrasting markings and unique objects) in a location where the actual item would be positioned. The method records an image of the market positioned in the location using, e.g., a video camera, sends the captured image to the augmented reality system, and receives an image of the actual item positioned at the chosen location. In various embodiments, the marker (e.g., placeholder) can be a sheet of paper (8.5"×11") with unique markings and that a user can download, print and placed at the location. A server receives the video stream of the placeholder in the location from the user's system, detects the placeholder, and sends a modified video stream with an item in place of the marker back to the user's system for display.

In various example embodiments, an input including item selection is received from a client to generate a placeholder and information for generating the placeholder is provided to the input source (e.g., the client) or a processing system with output capabilities. Video data of a camera-captured environment is received, in which the placeholder may be located. The input is analyzed to detect the placeholder and an image is retrieved according to the analysis. The visual data is modified to include an image data associated with the image, which, in some embodiments, may be an overlay of the image, and the modified visual data may be provided to the input source (e.g., a user's processing system) or another processing system. In some example embodiment, the retrieved image may be modified in accordance with the analysis to scale and orient the item image overlay in accordance with the environment and placement information determined from the placeholder information. In one example embodiment, the placeholder may be a printed sheet of paper with unique markings (e.g., bar code, contrastable image, two-dimensional data code) printable by the user from a home computer system. In some example embodiments, the sheet of paper may also be recognizable by other processing systems. In some embodiments, a single placeholder may be generic to multiple items and used interchangeably to represent more than one item. For example, when a user wishes to compare a first item with a second item in the same location, the placeholder may interchangeably represent both the first and second item, with needing to generate two placeholders. In some embodiments, a single placeholder can be used without associating the placeholder with any particular item. An example augmented reality system is discussed with reference to FIG. 1.

FIG. 1 is a diagrammatic representation of a network within which an example augmented reality system 100 for providing modified visual data to a processing system 110 may be implemented. As shown, the augmented reality system 100 may include a processing system 110 and a server 120. The server 120, in one example embodiment, may host an on-line trading platform. The processing system 110 may run an application 116, such as a web browser application and may have access to the server 120 via a network 130. The network 130 may be a public network (e.g., the Internet, a wireless network, etc.) or a private network (e.g., a local area network (LAN), a wide area network (WAN), intranet, etc.).

In one embodiment, the network-based trading platform may provide one or more marketplace applications, payment applications, and other resources. The market place application may provide a number of marketplace functions and services to users that access the marketplace. The payment applications, likewise, may provide a number of payment services and functions to users. The network-based trading platform may display various items listed on the trading platform. The embodiments discussed in the specification are not limited to network-based trading platforms, however. In additional embodiments, other publishing platforms, such as social networking websites, news aggregating websites, web portals, network-based advertising platforms, or any other system that display items to users, may be used.

The processing system 110 may include a camera source 112 (e.g., a video camera or digital still camera) for capturing a contextual environment (e.g., a living room) and a visual output 114 (e.g., an LCD display or the like) to present the contextual environment and, in an example embodiment, to present an augmented environment. The server 120 includes an item image source 122 and an augmented reality application 124. In some embodiments, the server 120 may be communicatively coupled with one or more databases 140, which may store item images 142.

Figure 4:
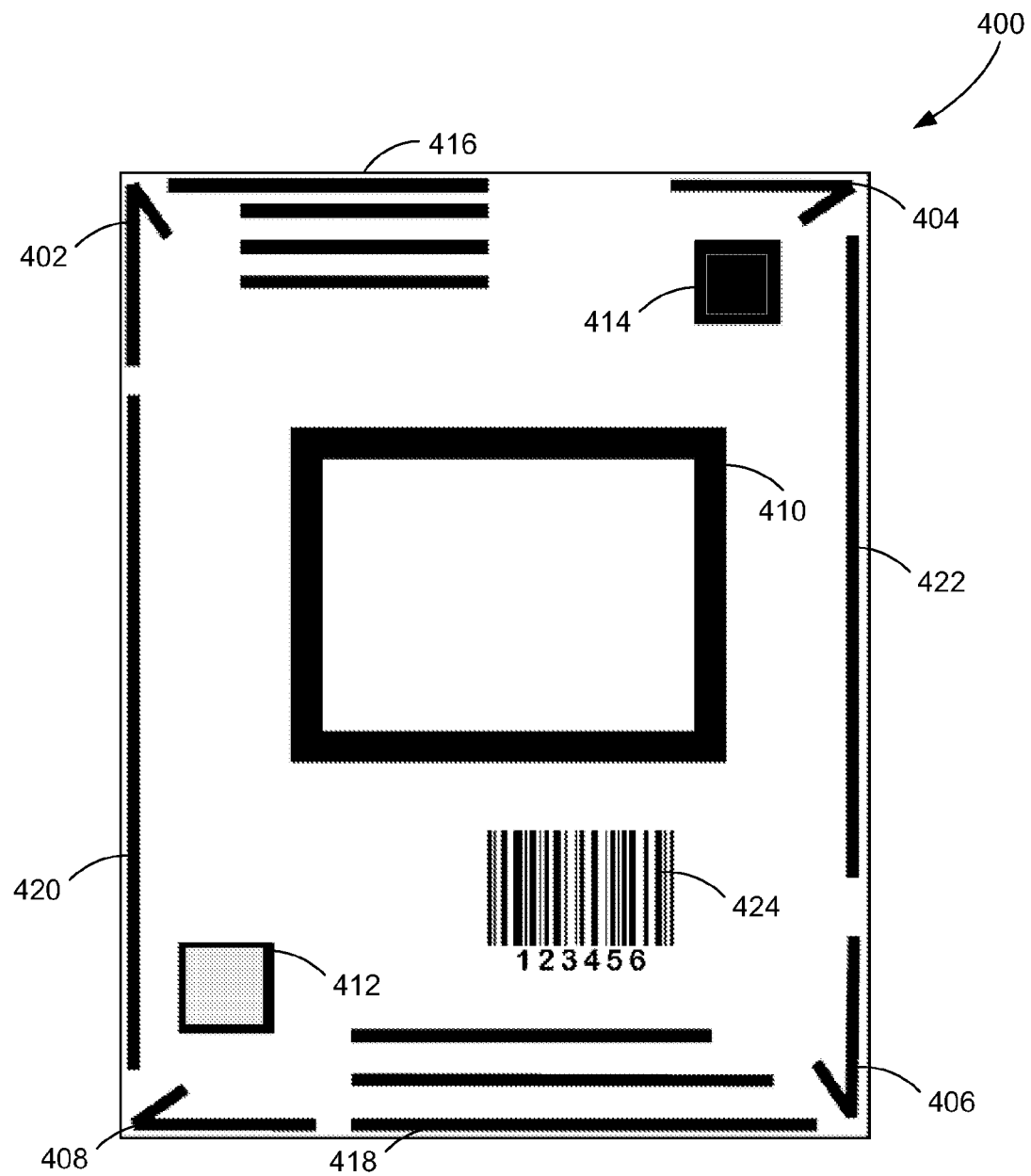
FIG. 4 is an example of a placeholder for use with the augmented reality system, in accordance with an example embodiment.
Figure 5:
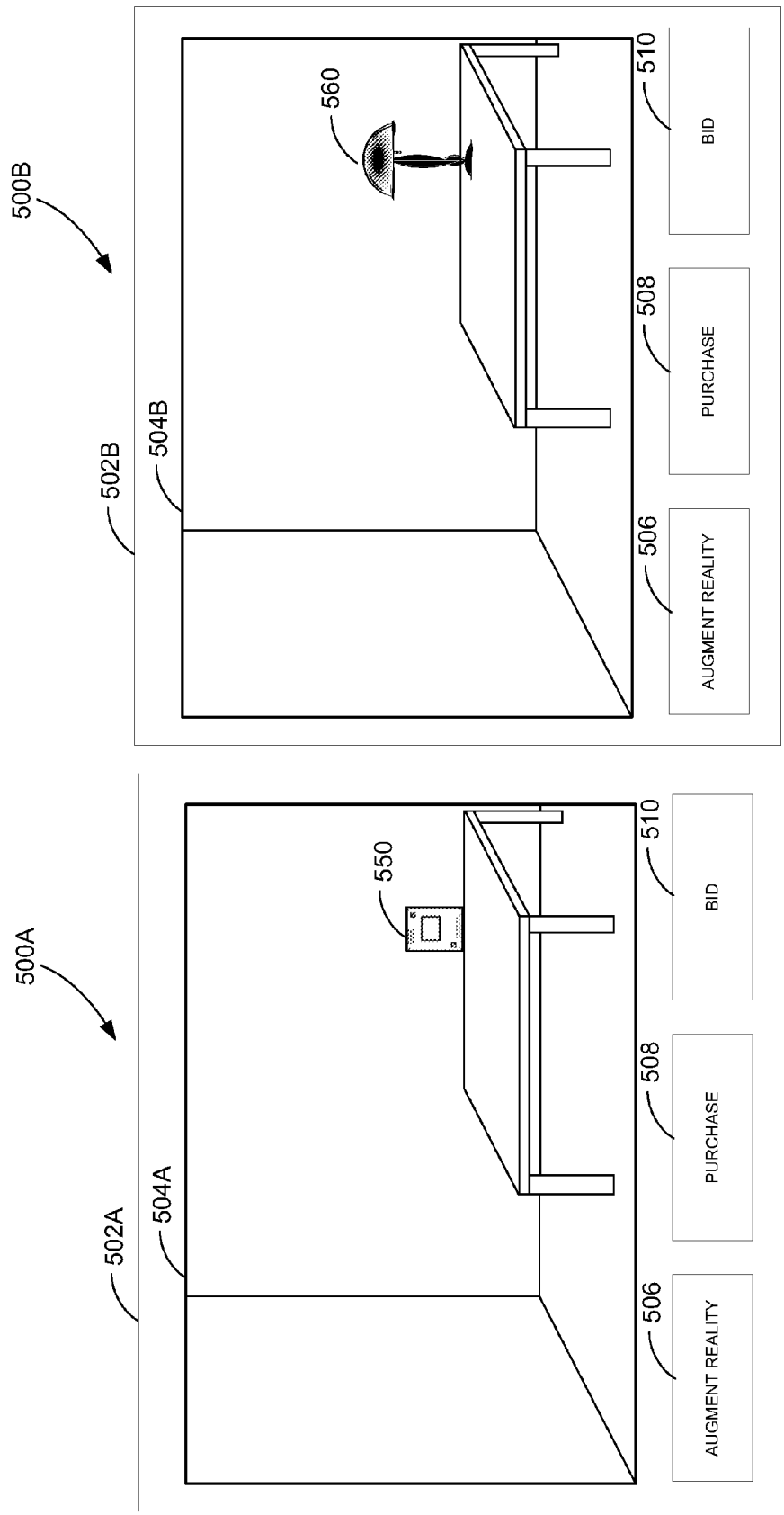
FIGS. 5A-B are example user interfaces illustrating a placeholder in a camera-captured environment and the resulting augmented reality display in a contextual environment, in accordance with an example embodiment.

In an example embodiment, the processing system 110 may send a request to the server 120 to modify a contextual environment captured by a camera source 112. In some embodiments, the request from the processing system 110 may include a user-selected item. In an embodiment, an augmented reality application 124 at the server 120 may detect the request, and provide placeholder generation information to the processing system 110 to generate a placeholder associated with the user-selected item. Upon receiving the placeholder generation information, a user in control of the processing system 110 may produce the placeholder, e.g., by printing an image of the placeholder provided by the augmented reality application 124. In some example embodiments, the placeholder may be an ordinary letter-sized sheet of paper (e.g., 8.5"×11") with unique markings, an example of which is illustrated in FIG. 4 and described below. The unique markings may be utilized by the augmented reality application 124 to identify the placeholder in the contextual environment and to determine a desired placement of the user-selected item within the contextual environment captured by the camera. In some embodiments, the placeholder may be generated using an auxiliary display device (e.g., mobile phone display) displaying the placeholder with unique markings. In other embodiments, the user may use the placeholder generation information to physically create the placeholder by drawing and/or coloring the unique markings onto an object, such as a piece of paper, or a three-dimensional object. In some embodiments, in addition to the user-selected item, the placeholder generation information and associated unique markings may be customized to accommodate elements of the environment based on received visual data collected by a camera. For example, the placeholder generation information may be produced by taking into considerations dimensions of the environment (e.g., room).

In another example embodiment, the augmented reality application 124 may receive and process visual data received from the processing system 110 and the camera source 112 communicatively coupled to the processing system 110, and provides modified visual data back to the processing system 110. For example, the camera source 112 may collect visual data of a contextual environment within which a placeholder is located. In some embodiments, one of the applications 116 may receive visual data. The application 116 may provide the visual data to the augmented reality application 124 of the server 120 via network 130. The augmented reality application 124 may analyze the visual data to detect placeholder information associated with a placeholder located within the captured contextual environment, and may also determine placement information from the placeholder information. The augmented reality application 124 may retrieve an image from an item image source 122 of the server 120 based on the placeholder information, placement information or any combination thereof. In some embodiments, the augmented reality application 124 may retrieve the image from the item images 142 stored in a database 140 that is communicatively coupled to the server 120. The augmented reality application 124 may then modify the visual data to include image data associated with the retrieved item image. In some embodiments, the augmented reality application 124 may modify the visual data with modified image data based on the determined placement information. In some embodiments, the augmented reality application 124 then provides modified visual data to the processing system 110 for visual display on a visual output 114.

In some embodiments, the processing system 110 may include an item image source, such as a library of item images stored on the processing system 110. In an example embodiment, a user may create a library of images of one or more items by way of the camera source 112 (e.g., digital camera). In one embodiment, an application hosted on the server 120 may be used to identify an item depicted in the image (see U.S. patent application Ser. No. 12/371,882) and the augmented reality application 124 may provide placeholder generation information from the server 120 to the processing system. In some example embodiments, the processing system 110 may host the augmented reality application 124 and may provide modified visual data, such as to the processing system 110 without use of the network 130 and the server 120.

Figure 2:
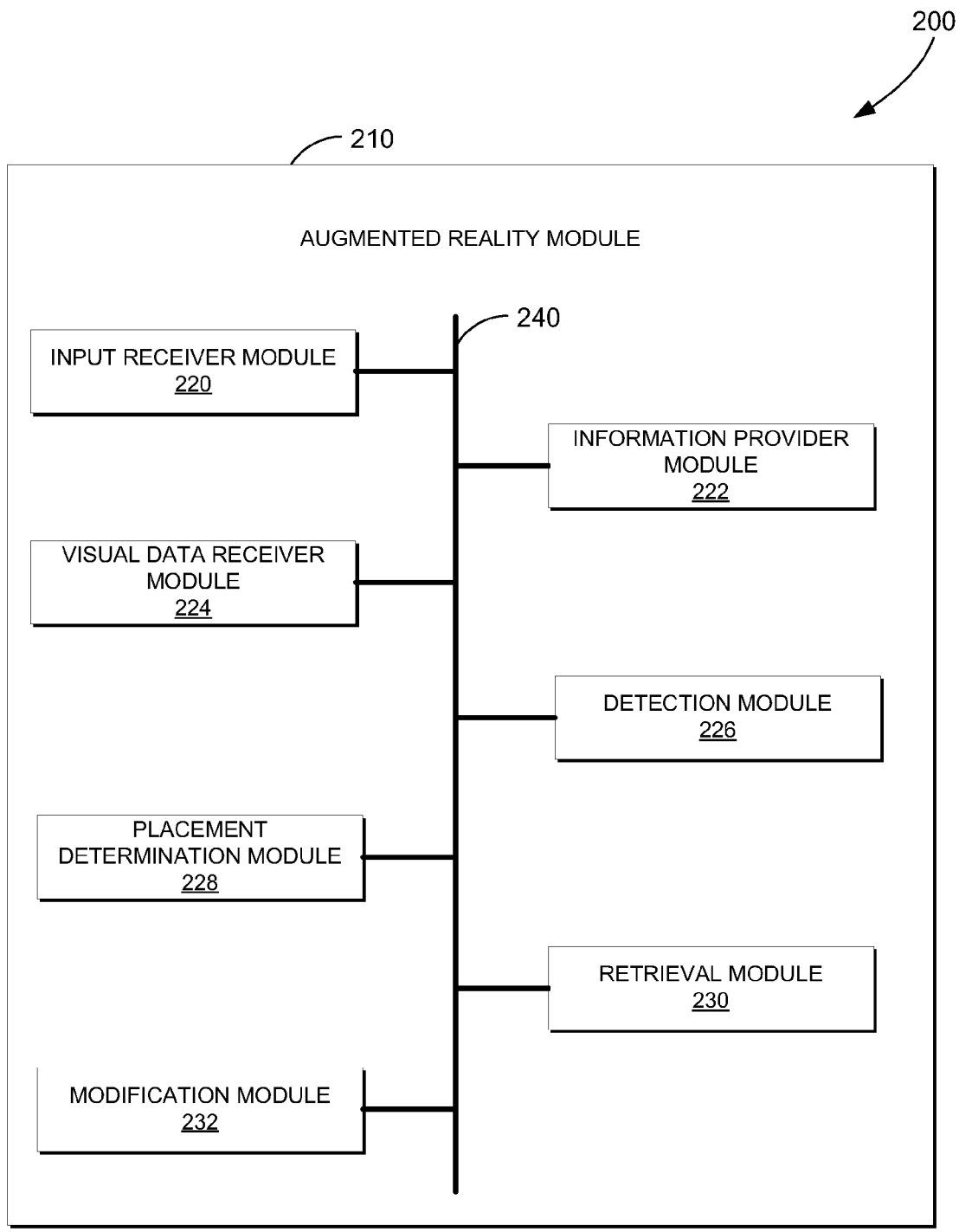
FIG. 2 is a block diagram of an example augmented reality module, in accordance with one example embodiment.

FIG. 2 is a block diagram 200 of an example augmented reality module 210, in accordance with one example embodiment. As shown in FIG. 2, augmented reality module 210 comprises in input receiver module 220, an information provider module 222, a visual data receiver module 224, a detection module 226, a placement determination module 228, a retrieval module 230, and a modification module 232. These modules of the augmented reality system may be communicatively coupled to other modules via a bus 240.

An input receiver module 220 may be configured to receive a request to commence an augmented reality application (e.g., augmented reality application 124 of FIG. 1). The request may include item information associated with a selected item. In one embodiment, the input receiver module 220 may be configured to receive the request (e.g., an input) from a source, such as, for example, the processing system 110 of FIG. 1. The input receiver module 220 may be configured to receive additional information from the processor system, such as, e.g., camera specifications, lighting and dimensional information of a captured contextual environment, data transmission rates, frame refresh rate, among other specifications of the processing system 110, and environment parameters known to those of ordinary skill in the art.

An information provider module 222 may be configured to determine placeholder generation information based on the received request and item information from the input receiver module 220. Placeholder generation information may include instructions (e.g., machine readable instructions) to generate a placeholder. In some embodiments, the placeholder generation information may be machine-readable information, such as, for example, an electronic document. In an embodiment, the information provider module 222 may produce a file deliverable to the requesting source (e.g., processing system 110) or any other processing system. For example, the information provider module 222 may generate an electronic document or an image file in any one or combination of formats (e.g., Portable Document Format (PDF), Microsoft® Word document, Joint Photographic Experts Group (JPEG) or the like). In operation, a user may interface with a processing system to select an item listing. The user may send a request to generate a placeholder for placement within an environment. The input receiver module 220 may receive the request, which, in some embodiments, may include information identifying the item listing selected by the user, and the information provider module 222 may generate an electronic document and deliver the document to the requesting source (e.g., processing system 110). In some embodiments, the request to generate the placeholder may include the item listing selected. In some embodiment, a user may receive placeholder generation instruction without selecting or sending a request to generate a placeholder.

A visual data receiver module 224 receives visual data from a client, such as the processing system 110, communicatively coupled to a camera, such as a digital camera, video camera (e.g., web cam), or the like. In one example embodiment, a user may position the camera to capture and view a contextual environment in which the user may want to view an item as it would appear in that environment. In some embodiments, the visual data receiver module 224 may process, some or all of the camera-captured visual data to determine parameters of the visual environment. For example, the visual data receiver module 224 may determine parameters of the captured environment including lighting, angles, dimensions, gravitational orientation, and the like, and may determine specifics of the camera, such as frame refresh rate, zoom capabilities, camera model information, and the like.

A detection module 226 detects placeholder information that may be included with the received visual data. In an embodiment, the placeholder information (e.g., machine-readable instructions to generate a document) is associated with a placeholder placed within a viewable location of a camera (e.g., within the camera-captured contextual environment), the camera communicatively coupled with a processing system (e.g., client device), the processing system providing visual data received by the camera to the augmented reality module 210 at the visual data receiver module 224. In one example, unique markings of the placeholder may be captured by a camera coupled to the processing system, and these unique markings may be detected by the detection module 226 as representing a placeholder in the captured environment.

In one embodiment, the detection module 226 may be configured to parse visual data received from the visual data receiver module 224 to determine whether the received visual data includes placeholder information within the visual data. In some embodiments, the detection module 226 may verify the placeholder information, such as to determine whether the placeholder information matches with the selected item received at input receiver module 220. In some embodiments, the detection module 226 may be configured to notify the client (e.g. processing system 110) when the placeholder information does not match the selected item. In an example, the detection module 226 may provide suggestions to the client source, such as to recreate the placeholder, reposition the placeholder, or the like.

A placement determination module 228 may be configured to determine placement information of a placeholder using the placeholder information received with the visual data. In one embodiment, the placement determination module 228 may determine various characteristics associated with the placeholder based on the placeholder information. For example, the placement determination module 228 may determine characteristics including coordinates and general location of the placeholder in the contextual environment captured by the camera, and may determine an orientation, scale factor, lighting effects, and any obstructions obstructing the placeholder in the contextual environment, or the like. In one embodiment, the placement determination module 228 may be configured to provide the placement information including characteristics to a retrieval module 230. In one example embodiment, the placement determination module 228 may be configured to determine the placement information of a placeholder based on unique markings of the placeholder. These unique markings may be detected by the detection module 226 as described above.

A retrieval module 230 may be configured to retrieve an image of the item upon detection of the image of the placeholder captured by the camera. The retrieval module 230 may retrieve the image based on the unique markings of the placeholder. The retrieval module 230 may incorporate information received from the detection module 226 and the placement determination module 228 when retrieving an image of the selected item. In one example, the retrieval module 230 may select an image from a plurality of images of the item based on determined characteristics of the placeholder determined from the placeholder information and received from the placement determination module 228, as described above. In an example embodiment, the retrieval module 230 may use the determined characteristics to select a best fit image from a plurality of images. In some embodiments, the retrieval module 230 may retrieve or determine physical dimensions of the item, such as the height, the length, and the width, and may select a best fit image from the plurality of images according to the physical dimensions of the item and/or the characteristics of the placeholder. In one example, the retrieval module 230 may be configured to modify image data associated with the retrieved image according to the physical dimensions of the item and the characteristics of the placeholder, such as to represent a scaled and oriented image within the contextual environment.

A modification module 232 may be configured to modify the received visual data to include image data associated with the retrieved image into the visual data according to the placement information. In some embodiments, the modification module 232 may be configured to modify the received visual data to include the modified visual data generated by retrieval module 230. In one example embodiment, the modification module 232 may return the modified visual data to the client (e.g. processing system 110) providing the item selection and/or the selection to augment reality.

It will be noted, that while FIG. 2 shows particular modules independent of other modules, other embodiments may include one or more modules in a single component. Additionally, embodiments may be provided where a component that is shown in FIG. 2 as a single module maybe implemented as two or more components. Various operations performed by the augmented reality module 210 may be discussed with reference to FIGS. 3-6.

Figure 3:
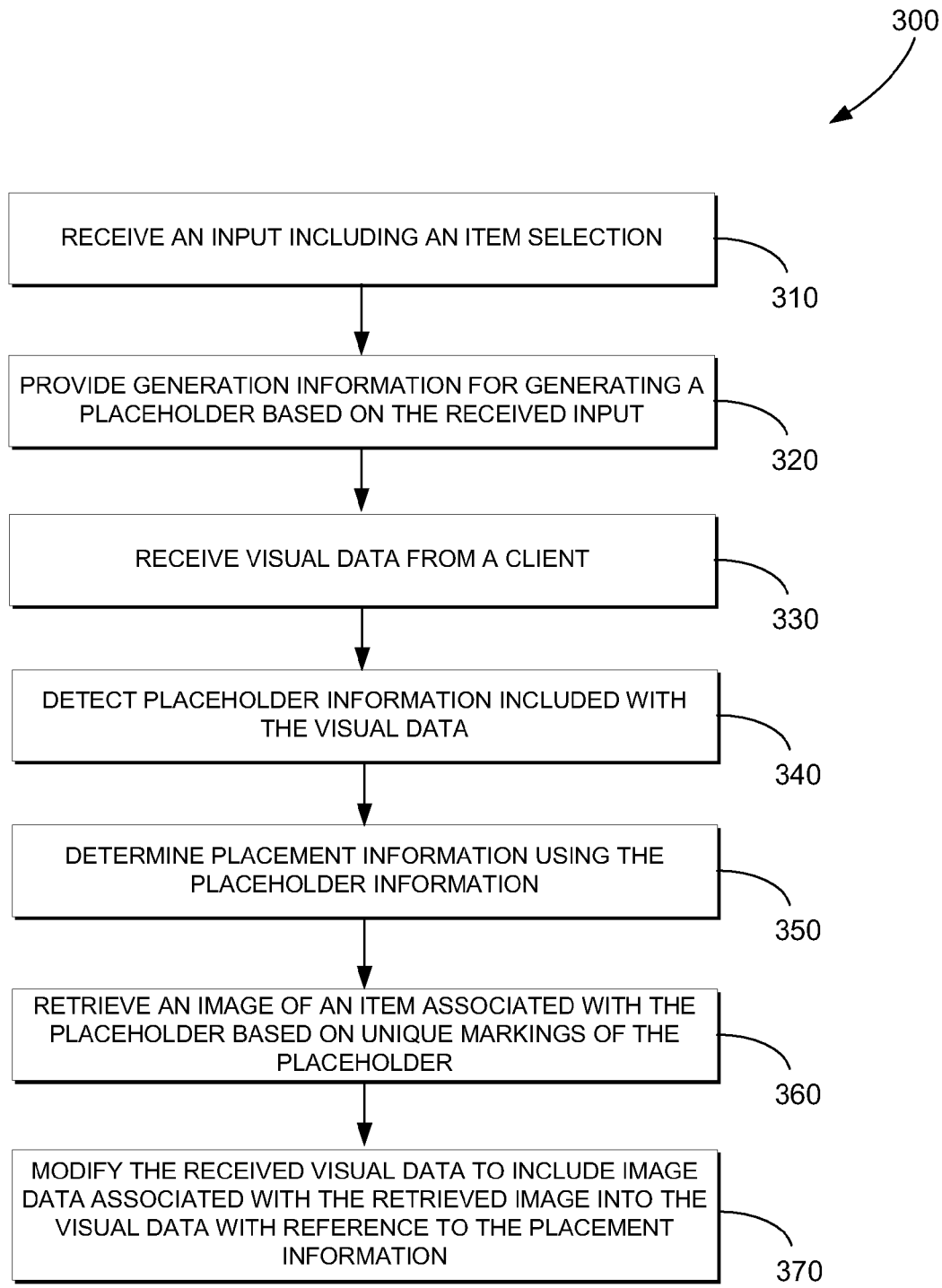
FIG. 3 is a flow chart of a method for providing modified visual data, in accordance with an example embodiment.

FIG. 3 is a flow chart of a method 300 for providing modified visual data, in accordance with an example embodiment. The method 300 may be performed by processing logic that may comprise hardware (e.g., dedicated logic, programmable logic, microcode, etc.) software (such as run on a general purpose computer system or a dedicated machine), or a combination of both. In one example embodiment, the processing logic may reside at a server 120 as shown in FIG. 1 in the form of an augmented reality application 124 of FIG. 1.

As shown in FIG. 3, the method 300 commences at operation 310 when the server 120 receives an input from a client (e.g., the processing system 110 of FIG. 1), the input including an item selection. At operation 320, the method 300 may provide generation information for generating a placeholder based on the received input. The generation information may be provided to the processing system 110 to permit a user to generate the placeholder using a printer, or view the placeholder using a visual display device (e.g., a mobile phone screen, a camera screen or the like). An example of a placeholder is depicted in FIG. 4 and described below.

At operation 330, the method 300 receives visual data from the client (e.g., processing system 110). In one embodiment, the visual data may be captured by a camera communicatively coupled with the client. At operation 340, the method 300 detects placeholder information included with the visual data; the placeholder information is associated with a placeholder placed in a contextual environment captured by the camera. At operation 350, the method 300 determines placement information using the placeholder information. At operation 360, the method 300 retrieves an image of an item associated with the placeholder based on the placeholder. At operation 370, the method 300 modifies the received visual data to include the image data associated with the retrieved image into the visual data with reference to the placement information. In an example, the retrieved image may be modified to reconcile the respective dimensions, orientation, etc. of the captured environment with the dimensions, orientation etc. of an item represented by the retrieve image. In some embodiments, the operation 370 of method 300 may provide the modified visual data to the client (e.g., processing system 110) providing the input at operation 310. Now the user may view the item as it would appear in the environment.

FIG. 4 is an example of a physical placeholder 400 for use with the augmented reality system 100 (e.g. processing system 110, server 120, and network 130 all of FIG. 1), in accordance with an example embodiment. In one example, upon receiving an input including an item selection, the augmented reality system 100 provides generation information to generate a placeholder 400 with unique markings 402-424 to a client source from which the input originated or, in some embodiment, any other processing system (e.g., a mobile phone). As previously described, the generation information may be a document, image, computer-readable instructions, or the like, for generating the placeholder 400 by use of rendering instrument such as, for example, a printer (e.g., in the case of a printable sheet) or a display screen (e.g., a display screen of a mobile phone, in the case of a non-printable digital file). In some embodiments, the placeholder 400 may be a standard sheet of paper (e.g., dimension of about 8.5"×11") with the unique markings 402-424. In other embodiments, the placeholder 400 may be an electronically displayable set of instructions for display on a mobile phone or an auxiliary display screen. In other embodiments, the placeholder 400 may be a three dimensional object.

The placeholder 400 may include any one or more of arrows 402, 404, 406, and 408, which provide the augmented reality system 100 an upside and a downside orientation for the placeholder 400, such as to orient the placeholder 400 when captured by the camera. In one embodiment, the augmented reality system 100 may calibrate a camera source 112 of FIG. 1 of the processing system 110 with any combination of arrows 402, 404, 406, and 408. In an example embodiment, the arrows 402, 404, 406, and 408 may be formed in a clockwise direction such as to allow the augmented reality system 100 to first determine a top side and bottom side orientation. When the page is flipped, the orientation determined by the augmented reality system 100 may be flipped by 180°. In one example embodiment, any directionally distinguishable shape may be substituted for one or more of the arrows 402, 404, 406, and 408. In one embodiment, the augmented reality system 100 may differentiate between the four corners of the placeholder 400 with use of the arrows 402, 404, 406, and 408 when rotating the page across various axes from an original orientation. In an example, when a user rotates the placeholder 400 in the camera-captured environment, the augmented reality system 100 detects the rotation and rotates the corresponding retrieved item image when presenting the item in the contextual environment on a visual output 114 of FIG. 1.

In one example embodiment, the placeholder 400 includes a middle rectangle 410, which may provide for an initial detection of the placeholder 400. In some embodiments, the augmented reality system 100 may initially detect the middle rectangle 410 before other unique markings when the placeholder 400 is placed a great distance away from the camera in an open environment, such as for example, an auditorium or in an outdoor environment. In other example embodiments, the middle rectangle 410 may be substituted with any design relatively large in size with relation to the placeholder 400 and generally located near the middle of the placeholder 400.

As depicted in FIG. 4, the placeholder 400 includes shaded objects 412 and 414 shaded with dissimilar colors to provide distinct regions of the placeholder 400 for detecting an orientation, scale, and distance of the placeholder 400. The augmented reality system may employ the shaded objects 412 and 414 for determining a left-right and depth dimensional orientation.

The placeholder 400 may further include line markings 416, 418, 420 and 422 to assist with augmented reality system in refining a third dimension for the placeholder 400. In one embodiment, the lines within each of a first and second set of lines 416 and 418 are equidistant for each set. The first and second sets of lines 416 and 418 may provide a depth of the object and a scale factor. By known methods, the augmented reality system may orient and scale the image based on any or all of the arrows 402, 404, 406, and 408; middle rectangle 410; shaded objects 412 and 414 and line markings 416, 418, 420, and 422.

In one embodiment, the unique markings of placeholder 400 may include identification markings 424, which may be item identification information used when verifying whether the generated placeholder 400 matches with a selected item. In other embodiments, these additional identification markings 424 may include or may reference additional information related to the selected item, such as for example, price, inventory, and suggested items related to the selected item. In some example embodiments, the additional information may be presentable along with the image of the item in the contextual environment. In some embodiments, the additional identification markings 424 may aid in uniquely identifying more than one placeholder 400 in the environment, and thereby, allow simultaneously presentation of a plurality of items in the contextual environment. In some embodiments, the identification markings 424 may be a one-dimensional barcode, two dimensional barcode, or any other marking uniquely associable with a selected item. In some embodiments, a placeholder may be generated that may not be associable with one particular item and may be interchangeably used to represent more than one item.

FIGS. 5A-B are screen shots 500A and 500B of example user interfaces 502A and 502B illustrating a placeholder 550 in a camera-captured environment and the resulting augmented reality image 560 displayed in the contextual environment, in accordance with an example embodiment. In an example, a user may direct a camera toward a location such as the user's living room, which provides the contextual environment for the augmented reality. The user interface 502A illustrates a visual frame 504A of the camera-captured environment (e.g., a living room). In some embodiments, the user interface 502A and 502B may include selection buttons 506, 508, and 510. Selection button 506 may be selected to augment reality, selection button 508 may be selected to purchase an item, and selection button 510 may be selected to place a bid on an item.

For example, a user may select an item, such as a lamp, and orient a camera to view an environment in which the user may want to place the lamp (e.g., a bedroom). The user may select the augment reality selection button 506 at a client (e.g., the processing system 110 of FIG. 1) to provide an input along with the item selection information to a server (e.g., server 120 of FIG. 1). The server 120 may provide generation information to the client (e.g., processing system 110) to generate a placeholder, such as the placeholder 400 depicted in FIG. 4 and the user may place the placeholder in the camera-captured environment. Screen shot 500A illustrates a user interface 502A of FIG. 5A with a placeholder 550 viewable within a camera-captured environment in visual frame 504A.

The augmented reality application 124 of FIG. 1 at the server 120 receives the visual data of the camera-captured environment (shown in visual frame 504A including the placeholder 550) viewable from the client device (e.g., processing system 110). The augmented reality application 124 detects the placeholder information associated with the placeholder 550 included with the visual data and determines placement information from the placeholder information. The augmented reality application 124 then retrieves an image of the item associated with the placeholder 550. In some embodiments, the unique markings of the placeholder 550 may be used to determine which item is associated with the placeholder, or which image of the item may be selected from a plurality of images of an item. The augmented reality application 124 provides the client device (e.g., processing system 110) with modified visual data, which includes the image data associated with the retrieved image of the selected item. In some embodiments, the augmented reality application 124 replaces the placeholder information with the image data, such as to modify the received visual data and to display a replacement image of the item within the camera-captured viewable in visual frame 504B. In an example embodiment, as shown in FIG. 5B, the augmented reality application 124 may modify the received visual data by providing overlay image data in place of the placeholder information, such as to display an overlay of the item image (e.g., augmented reality image 560) within the camera-captured viewable in visual frame 504B.

Figure 6:
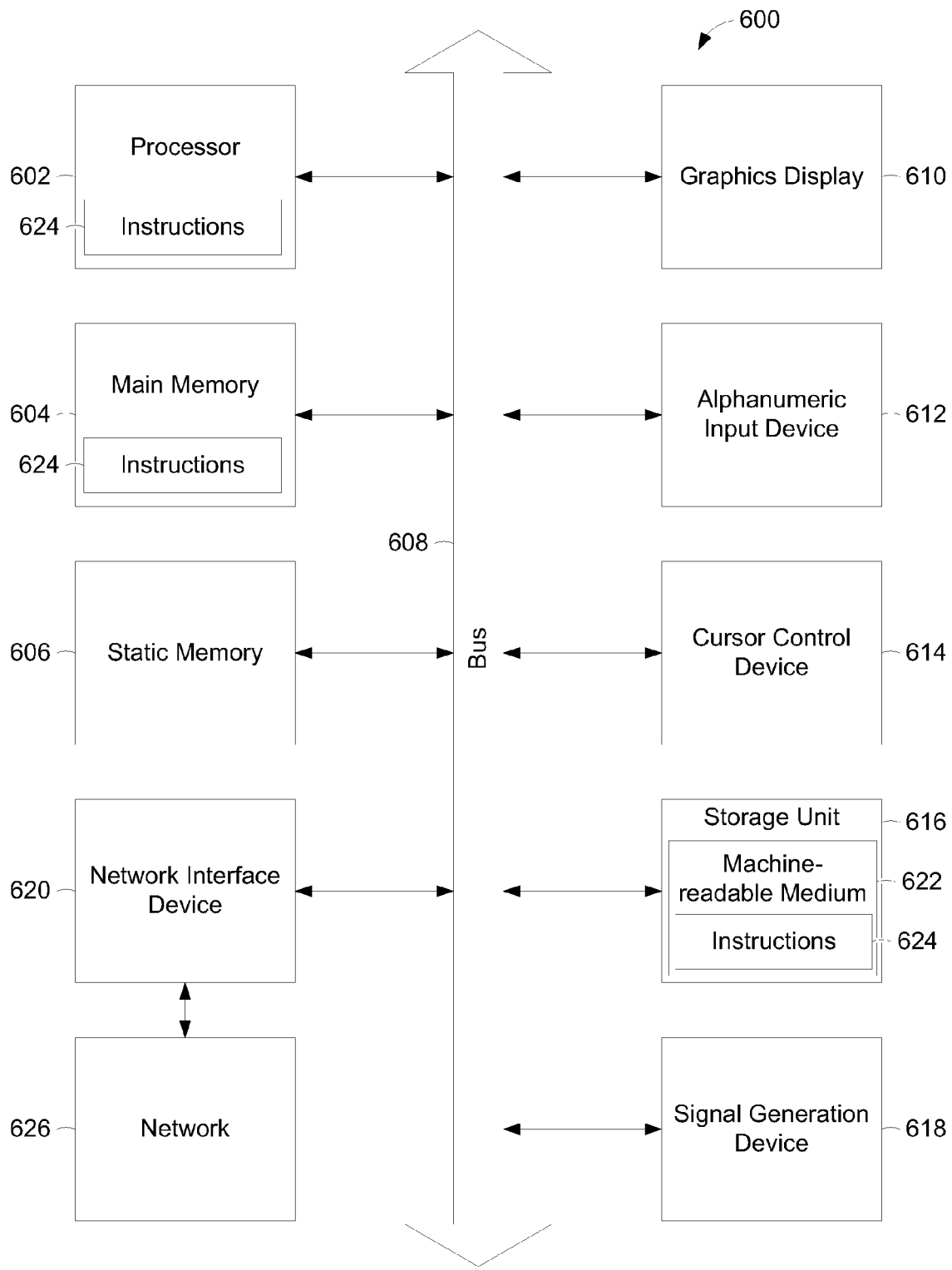
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network, or as a peer machine in a peer-to-peer (or distributed) network. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of embodiments of the present disclosure, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, an augmented reality system has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

What is claimed is:

1. A computer-implemented method comprising:
   receiving visual data from a client, the visual data including placeholder information associated with a placeholder, the placeholder comprising:
   a first portion operable to provide detection of the placeholder information;
   a second portion operable to provide placement information related to the placeholder, the second portion including at least two shaded objects that are dissimilar in color, the at least two shaded objects being operable to provide an orientation of the placeholder and a distance of the placeholder from a camera; and
   a set of unique markings operable to identify an item corresponding to the placeholder;
   detecting the placeholder information included with the visual data using the first portion of the placeholder;
   determining the placement information using the second portion of the placeholder, the determining of the placement information comprising determining the orientation of the placeholder and the distance of the placeholder from the camera using the at least two shaded objects of the second portion of the placeholder;
   identifying the item corresponding to the placeholder based on the set of unique markings of the placeholder;
   retrieving information about the item using the set of unique markings of the placeholder;
   selecting an image of the item from a plurality of images of the item based on the determined placement information, the selected image of the item being a best fit image according to physical dimensions of the item;
   retrieving the selected image of the item; and
   using a processor, modifying the received visual data to include image data associated with the retrieved image and to include the retrieved information about the item with reference to the location of the placeholder.

2. The method of claim 1, further comprising:
   receiving an input including an item selection; and
   providing generation information for generating the placeholder based on the received input.

3. The method of claim 1, wherein the determining of the placement information further comprises determining a scale factor.

4. The method of claim 3, wherein the selecting of the image of the item is based on the determined scale factor.

5. The method of claim 3, wherein the retrieving of the selected image of the item associated with the placeholder further comprises:
   determining dimensions of the item; and
   modifying the retrieved image of the item in reference to the determined dimensions and the determined scale factor of the item.

6. The method of claim 3, wherein the determining of the scale factor further comprises detecting at least one of a change in contrast or edge portions of the placeholder.

7. The method of claim 1, further comprising determining characteristics of the placeholder based on the placeholder information, wherein the selecting the image of the item from the plurality of images of the item is based on the determined characteristics of the placeholder.

8. The method of claim 1, wherein the retrieved information includes a suggested item related to the item.

9. The method of claim 1, wherein the determining of the placement information further comprises:
   determining a scale factor based on the distance of the placeholder from a camera; and
   determining an orientation factor based on an angle of the placeholder in relation to the camera.

10. The method of claim 9, wherein the modifying of the received visual data to include the retrieved image with reference to the location of the placeholder further comprises:
    modifying the retrieved image with reference to the scale factor and the orientation factor; and
    modifying the received visual data with modified retrieved image data.

11. A system comprising:
    a processor-implemented visual data receiver module to receive visual data from a client, the visual data including placeholder information associated with a placeholder, the placeholder comprising:
    a first region operable to provide detection of the placeholder;
    a second region operable to identify a location and orientation of the placeholder, the second region including at least two shaded objects that are dissimilar in color, the at least two shaded objects being operable to provide an orientation of the placeholder and a distance of the placeholder from a camera; and
    a set of unique markings operable to identify an item associated with the placeholder;
    a processor-implemented detection module to detect the placeholder information using the first region of the placeholder;
    a processor-implemented placement determination module to determine placement information using the second region of the placeholder, the determining of the placement information comprising determining the orientation of the placeholder and the distance of the placeholder from the camera using the at least two shaded objects of the second portion of the placeholder;
    a processor-implemented retrieval module to identify the item associated with the placeholder based on the set of unique markings of the placeholder, the processor-implemented retrieval module further to retrieve information about the item using the set of unique markings, the processor-implemented retrieval module further to select an image of the item from a plurality of images of the item based on the placement information, the selected image of the item being a best fit image according to physical dimensions of the item, the processor-implemented retrieval module further to retrieve the selected image of the item; and a processor-implemented modification module to modify the received visual data to include image data associated with the retrieved image and to include the retrieved information about the item at the location of the placeholder.

12. The system of claim 11, further comprising:
a processor-implemented input receiver module for receiving an input including an item selection; and
a processor-implemented information provider module for providing generation information for generating the placeholder based on the received input.

13. The system of claim 11, wherein the processor-implemented placement determination module is to determine a scale factor.

14. The system of claim 11, wherein the information about the item includes a price of the item.

15. The system of claim 13, wherein the processor-implemented image retrieval module is to:
determine dimensions of the item; and
modify the retrieved image of the item utilizing the determined dimensions and the determined scale factor of the item.

16. The system of claim 11, wherein the processor-implemented detection module is further to detect at least one of a change in contrast of the placeholder or edges of the placeholder.

17. The system of claim 11 wherein the processor-implemented modification module is further to retrieve information associated with the item for display with the item image.

18. The system of claim 11, wherein the processor-implemented placement determination module is further to determine parameters of the placeholder based on the placeholder information, and wherein the processor-implemented retrieval module is further to select the image of the item from the plurality of images of the item based on determined parameters of the placeholder.

19. The system of claim 11, wherein the processor-implemented placement determination module is further to determine a scale factor based on the distance of the placeholder from a camera, and to determine an orientation factor based on an angle of the placeholder in relation to the camera.

20. A non-transitory machine-readable medium embodying instructions that, when executed by a machine, cause the machine to perform operations comprising:
receiving an input including a selection of an item;
providing generation information for generating a placeholder based on the received input, the placeholder comprising:
a first portion operable to identify the placeholder;
a second portion operable to identify a location and orientation of the placeholder, the second portion including at least two shaded objects that are dissimilar in color and operable to provide an orientation of the placeholder and a distance of the placeholder from a camera; and
a set of unique markings operable to identify the item;
receiving visual data from a client;
detecting placeholder information included with the visual data using the first portion of the placeholder;
determining the placement information using the second portion of the placeholder, the determining of the placement information comprising determining the orientation of the placeholder and the distance of the placeholder from the camera using the at least two shaded objects of the second portion of the placeholder;
identifying the item associated with the placeholder based on the set of unique markings of the placeholder;
retrieving information about the item using the set of unique markings of the placeholder;
selecting an image of the item from a plurality of images of the item based on the placement information, the selected image of the item being a best fit image according to physical dimensions of the item;
retrieving the selected image of the item associated with the placeholder determined based on the unique markings of the placeholder; and
modifying the received visual data to include image data associated with the retrieved image and to include the retrieved information about the item.

* * * * *